United States Patent
Divasto et al.

(10) Patent No.: US 12,480,920 B2
(45) Date of Patent: Nov. 25, 2025

(54) METHOD FOR THE DETECTION AND QUANTIFICATION OF FOSFOMYCIN, IMPURITIES AND DEGRADATION PRODUCTS THEREOF

(71) Applicant: MEITHEAL PHARMACEUTICALS, INC., Chicago, IL (US)

(72) Inventors: Robert Divasto, Barcelona (ES); Marta Mariño, Barcelona (ES)

(73) Assignee: Meitheal Pharmaceuticals, Inc., Chicago, IL (US)

( * ) Notice: Subject to any disclaimer, the term of this patent is extended or adjusted under 35 U.S.C. 154(b) by 921 days.

(21) Appl. No.: 17/441,551

(22) PCT Filed: Mar. 10, 2020

(86) PCT No.: PCT/EP2020/056327
§ 371 (c)(1),
(2) Date: Sep. 21, 2021

(87) PCT Pub. No.: WO2020/187644
PCT Pub. Date: Sep. 24, 2020

(65) Prior Publication Data
US 2022/0146470 A1     May 12, 2022

(30) Foreign Application Priority Data
Mar. 21, 2019 (ES) .................. 201930256

(51) Int. Cl.
*G01N 30/84* (2006.01)
*G01N 30/02* (2006.01)
(Continued)

(52) U.S. Cl.
CPC ............. *G01N 30/84* (2013.01); *G01N 30/34* (2013.01); *G01N 30/64* (2013.01);
(Continued)

(58) Field of Classification Search
CPC ........ G01N 30/84; G01N 30/34; G01N 30/64; G01N 2030/027; G01N 2030/645;
(Continued)

(56) References Cited

U.S. PATENT DOCUMENTS 9,441,053 B2   9/2016  Wang et al.
2010/0239667 A1*  9/2010  Hemmingsen ....... A61K 31/167
                                                                          424/495

FOREIGN PATENT DOCUMENTS

CN          115166083    *  7/2022
WO   WO-2016051170 A1 *  4/2016  ............. G01N 30/34

OTHER PUBLICATIONS

Buszewski, B. et al. (2012). "Hydrophilic interaction liquid chromatography (HILIC)—a powerful separation technique." Annals Bioanalytical Chemistry. 402:231-247. (Year: 2012).*
(Continued)

*Primary Examiner* — Jill A Warden
*Assistant Examiner* — Jacqueline Brazin
(74) *Attorney, Agent, or Firm* — McDonnell Boehnen Hulbert & Berghoff LLP

(57) ABSTRACT

The present invention relates to a method for the detection and quantification of fosfomycin and impurities and/or degradation products thereof in samples of fosfomycin or a pharmaceutically acceptable salt thereof or in pharmaceutical compositions comprising fosfomycin or a pharmaceutically acceptable salt thereof. The present invention further relates to a process for manufacturing fosfomycin, or a pharmaceutically acceptable salt thereof having a specified purity degree, as well as to the fosfomycin or a pharmaceutically acceptable salt thereof as obtained. The present invention further relates to a process for manufacturing a pharmaceutical composition comprising fosfomycin or a pharmaceutically acceptable salt thereof and at least one pharmaceutically acceptable excipient having a specified
(Continued)

purity degree, as well as to the pharmaceutical composition as obtained.

19 Claims, 9 Drawing Sheets

(51) Int. Cl.
 *G01N 30/34* (2006.01)
 *G01N 30/64* (2006.01)
(52) U.S. Cl.
 CPC . *G01N 2030/027* (2013.01); *G01N 2030/645* (2013.01); *G01N 2030/8452* (2013.01)
(58) Field of Classification Search
 CPC ..... G01N 2030/8452; G01N 2030/884; G01N 30/88; C07F 9/65505; B01D 15/305
 USPC .......................................................... 436/161
 See application file for complete search history.

(56) References Cited

OTHER PUBLICATIONS

Liu, H., et al. "Determination of fosfomycin trometamol and its related substances in the bulk drug by ion-pair HPLC with evaporative light scattering detection." J. Liquid Chromatography & Related Tech. 15-24. (Year: 2007).*
International Search Report and Written Opinion issued in PCT/EP2020/056327, mailed Jun. 16, 2020.
Hao Liu et al., "Determination of Fosfomycin Trometamol and its Related Substances in the Bulk Drug by Ion-Pair HPLC with Evaporative Light Scattering Detection", Journal of Liquid Chromatography and Related Technologies, vol. 29, No. 1, Jun. 1, 2006, pp. 15-24.
S.D. McCrossen et al : "Comparison of LC detection methods in the investigation of non-UV detectable organic Impurities in a drug substance", Journal of Pharmaceutical and Biochemical Analysis, vol. 17, No. 3, Jul. 1, 1998, pp. 455-471.

* cited by examiner

METHOD FOR THE DETECTION AND QUANTIFICATION OF FOSFOMYCIN, IMPURITIES AND DEGRADATION PRODUCTS THEREOF

CROSS-REFERENCE TO RELATED PATENT APPLICATIONS

This application is a U.S. National Phase Application under 35 U.S.C. § 371 of International Patent Application No. PCT/EP2020/056327, filed Mar. 20, 2020, and claims priority to Spanish Application No. P201930256, filed Mar. 21, 2019, all of which are incorporated by reference in their entireties. The International Application was published on Sep. 24, 2020 as International Publication No. WO 2020/187644 A1.

TECHNICAL FIELD

The present invention relates to a method for detecting and quantifying the antibiotic fosfomycin and its impurities and/or degradation products, both in samples of the active ingredient alone and in pharmaceutical compositions containing it.

STATE OF THE ART

Fosfomycin is a broad-spectrum antibiotic with activity against gram-positive bacteria, including multi-drug resistant (MDR) pathogens associated with life threatening infections. Its mechanism of action is related to the inhibition of bacterial cell wall synthesis through the inhibition of the enzyme phosphoenolpyruvate transferase.

Fosfomycin can be administered either orally or by intramuscular or intravenous injection.

When administered orally, fosfomycin is generally used in the form of the calcium or trometamol salt and is available in pharmaceutical dosage forms such as capsules, or as granules to be reconstituted with water, and is mainly indicated for the treatment of urinary tract infections.

Injectable compositions generally comprise the disodium salt of fosfomycin and are available as sterile powder, usually with succinic acid as excipient, to be reconstituted before injection.

Intramuscular fosfomycin is primarily indicated for the treatment of infections of the genitourinary tract, the respiratory tract and soft tissue infections, among others, while the main indications of intravenous fosfomycin are complicated urinary tract infections, osteomyelitis, nosocomial lower respiratory tract infections and bacterial meningitis, among others.

As for any other active pharmaceutical ingredient, it is essential to have effective analytical methods for the quantitative determination of fosfomycin and its impurities and/or degradation products, both in samples of the active substance and in pharmaceutical compositions, in order to ensure that the necessary purity levels are fulfilled.

The determination of fosfomycin is problematic because it is a small, acid, hydrophilic and highly polar molecule, so the most common techniques, such as reverse phase or normal phase liquid chromatography, are inadequate. Another added difficulty is that the fosfomycin molecule lacks a chromophore, so the use of a standard ultraviolet (UV) detector is also ineffective.

Consequently, there are only few disclosures in the prior art about effective methods for determining fosfomycin in pharmaceutical samples, let alone for determining fosfomycin and its impurities and degradation products.

In the article Liu et al., *Determination of fosfomycin trometamol and its related substances in the bulk drug by ion-pair HPLC with evaporative light scattering detection*, J. Liq. Chromatogr. Relat. Technol., 2006, 29, 15-24, an ion-pair reverse phase HPLC method is disclosed for determining fosfomycin and just one impurity thereof (impurity A) in a fosfomycin trometamol bulk drug sample. Using a C18 column, the optimized mobile phase was a 15 mM octylamine solution (adjusted to pH 5.2 with glacial acetic acid) with acetonitrile (92:8). Evaporative light scattering detection (ELSD) was used.

Therefore, there remains a need for an effective analytical method for the determination of fosfomycin and its impurities and/or degradation products, both in samples of the active substance and in pharmaceutical compositions, which allows the identification and quantification of substantially all impurities and/or degradation products present in the samples.

Object of the Invention

The object of the present invention is a method for the detection and quantification of fosfomycin and its impurities and/or degradation products.

Another aspect of the invention is a process for manufacturing fosfomycin or a pharmaceutically acceptable salt thereof having a specified purity degree comprising the use of said method.

Another aspect of the invention is a process for manufacturing a pharmaceutical composition comprising fosfomycin or a pharmaceutically acceptable salt thereof and at least one pharmaceutically acceptable excipient having a specified purity degree comprising the use of said method.

Another aspect of the invention is fosfomycin or a pharmaceutically acceptable salt thereof having a specified purity degree prepared by the processes described herein.

Another aspect of the invention is a pharmaceutical composition comprising fosfomycin or a pharmaceutically acceptable salt thereof and at least one pharmaceutically acceptable excipient having a specified purity degree prepared by the processes described herein.

DETAILED DESCRIPTION OF THE INVENTION

Figure 1:
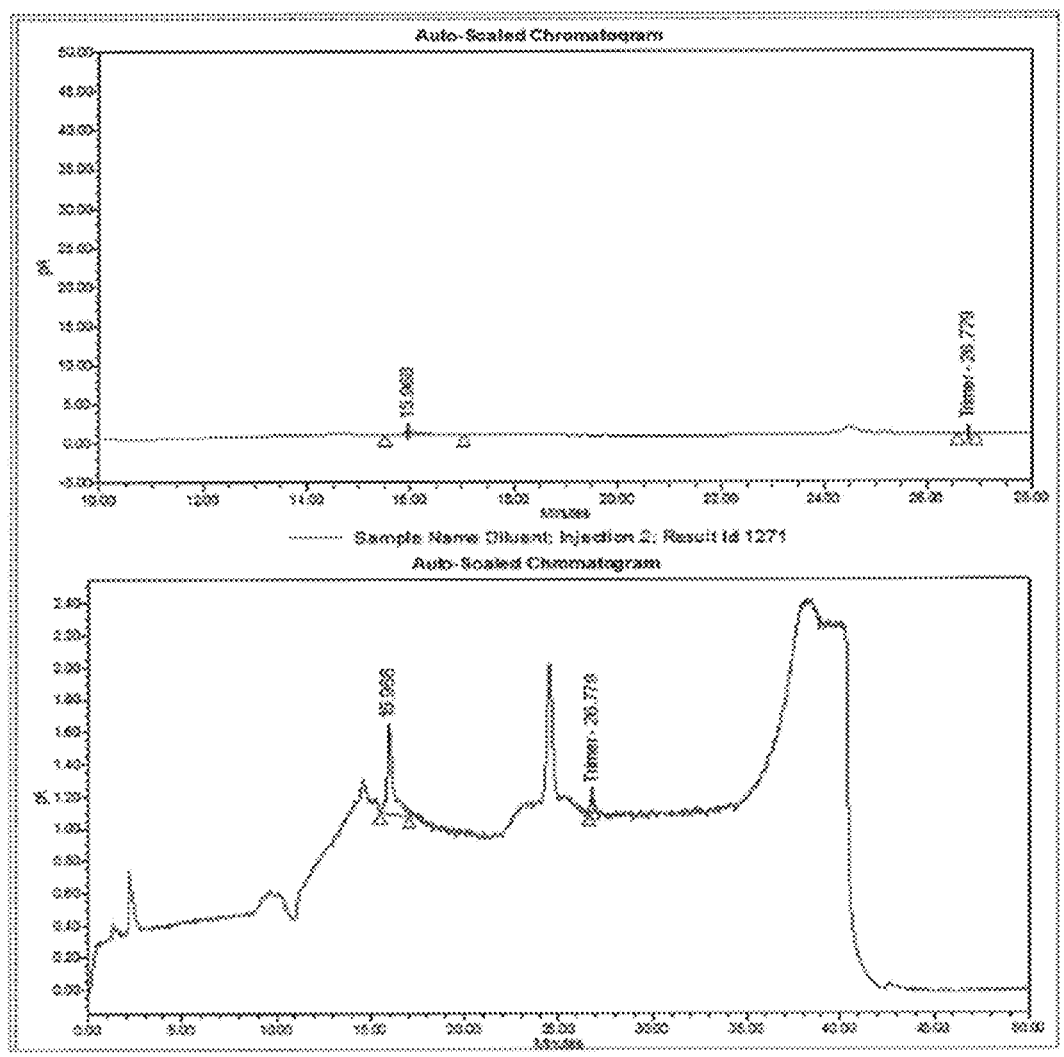
FIG. 1 shows a representative chromatogram using HILIC high performance liquid chromatogram and CAD detection (HILIC-HPLC-CAD) of the diluent solution (25 mM ammonium acetate in acetonitrile, 50:50, v/v) (Example 1). The x-axis represents the retention time (in minutes) and the y-axis indicates the detector response (peak area).

The object of the present invention is a method for the detection and quantification of fosfomycin and impurities and/or degradation products thereof in samples of fosfomycin or a pharmaceutically acceptable salt thereof or in pharmaceutical compositions comprising fosfomycin or a pharmaceutically acceptable salt thereof, said method comprising:

a) subjecting the sample to hydrophilic interaction liquid chromatography (HILIC) with gradient elution using as mobile phase a mixture of acetonitrile (mobile phase A) and an aqueous solution of ammonium acetate (mobile phase B); and b) detecting and quantifying fosfomycin, impurities and/or degradation products separated in step a) using a charged aerosol detector (CAD).

After unsuccessfully evaluating many analytical options, the authors of the present invention have developed a method based on hydrophilic interaction liquid chromatography (HILIC) combined with a charged aerosol detector (CAD) that, surprisingly, allows to identify many more impurities or degradation products of fosfomycin than in the methods reported so far in the state of the art. Namely, more than 10 different substances or degradation products were successfully identified and quantified.

Along the present description, as well as in the claims, the singular expressions, generally preceded by the articles "a", "an" or "the", are meant to include also the plural forms, unless the context clearly indicates otherwise. Furthermore, numeric values preceded by the term "about" or "approximately" are meant to include the exact stated value and also a certain variation around such value, namely a variation or ±5% of the stated amount. Numeric ranges defined by lower and upper endpoints are meant to include also said stated endpoints. Unless otherwise indicated, the percentages (%) are expressed as weight/weight percentages. It is part of the general knowledge of a person skilled in the art that a pharmaceutical composition comprises at least one pharmaceutically acceptable excipient (see below wherein it is explicitly described).

Fosfomycin

Fosfomycin is the International Nonproprietary Name (INN) assigned to the compound [(2R,3S)-3-methyloxyran-2-yl]phosphonic acid (CAS number 23155-02-4, molecular formula $C_3H_7O_4P$, molecular weight 138.06 g/mol) and has the following structure:

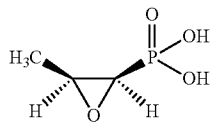

It is a broad-spectrum antibiotic that acts by inhibiting the synthesis of the bacterial cell wall. Chemically, it is an acid substance, specifically, a phosphonic acid, and is usually used in therapy in the form of a salt, for example, as the disodium salt, the calcium salt or the salt with tromethamine.

In a preferred embodiment, the method of the invention is for the detection and quantification of fosfomycin and impurities and/or degradation products thereof in samples containing fosfomycin in the form of fosfomycin disodium salt.

Fosfomycin disodium, in particular, has chemical formula $C_3H_5Na_2O_4P$ and the molecular weight is 182.02 g/mol.

In the monographs of the disodium, calcium and tromethamine salts of fosfomycin in the European Pharmacopoeia only one impurity is identified, designated as "impurity A", which corresponds to (1,2-dihydroxypropyl)phosphonate, i.e., to the opening of the epoxide ring. For example, for the case of disodium fosfomycin, impurity A has the following structure:

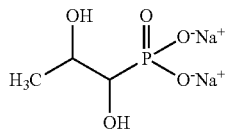

In one embodiment of the invention, the method relates to the detection and quantification of fosfomycin and its impurities and/or degradation products in a sample of fosfomycin or a pharmaceutically acceptable salt thereof active ingredient (API sample), preferably in a sample of fosfomycin disodium API.

In another embodiment, the method relates to the detection and quantification of fosfomycin and its impurities and/or degradation products in a sample of a pharmaceutical composition comprising fosfomycin or a pharmaceutically acceptable salt thereof, preferably fosfomycin disodium, as the active ingredient and at least one pharmaceutically acceptable excipient.

The pharmaceutical composition may be in the form different dosage forms, for example, as powder, granulate, capsule or tablet for oral administration, as powder for reconstitution to prepare a solution for injection or as a solution for injection.

Among the various commercially available fosfomycin dosage forms there is an injectable form containing fosfomycin disodium as the active ingredient and succinic acid as excipient.

In one embodiment, the pharmaceutical composition is a powder for reconstitution for injection.

In another embodiment, the pharmaceutical composition is a capsule or tablet.

In one embodiment, the pharmaceutical composition comprises succinic acid as excipient.

In a preferred embodiment of the invention, the pharmaceutical composition consists essentially of fosfomycin or a pharmaceutically acceptable salt thereof, preferably fosfomycin disodium, and succinic acid, preferably wherein the amount of succinic acid in the composition is between 1-5% (w/w), relative to the total weight of the composition.

The Analytical Method of the Invention

Charged Aerosol Detection (CAD)

Charged Aerosol Detectors (CAD), also known as "Corona", are well known as universal detectors for use in conjunction with liquid chromatography. In short, their action is based on nebulizing into droplets the eluent containing the analytes when it exits the column, subsequently evaporating the solvent to form particles, charging the particles in a reaction chamber by collision with ionized nitrogen, which is formed when nitrogen is passed over a corona wire, and measuring the particle charge by a sensitive electrometer. This generates a signal directly proportional to the quantity of analyte present. Any analyte, as long as it forms a particle, can be measured by charged aerosol detection, regardless of its chemical structure.

The principles and uses of Charged Aerosol Detection (CAD) are well-known in the art and are widely disclosed in the literature, for example, in the book *Charged Aerosol Detection for Liquid Chromatography and Related Separation Techniques*, PH Gamache Editor, John Wiley & Sons, 2017.

The CAD detectors are commercially available, to be used in conjunction with liquid chromatography columns, for example from the company Thermo Fisher Scientific.

Hydrophilic Interaction Chromatography (HILIC)

Hydrophilic interaction liquid chromatography (HILIC), as is well-known in the field of analytical chemistry, is a type of high-performance liquid chromatography characterized by using mixtures of water or buffer solution and organic solvents as mobile phase, while the stationary phases are highly hydrophilic polar adsorbents (see, for example, *Hydrophilic Interaction Chromatography. A Guide for Practitioners*. B. A. Olsen & B. W. Pack, Editors, John Wiley & Sons, 2013).

Examples of stationary phases are unmodified silica, or silica with some linked polar group, such as amines, amides, polyols, cyano, or zwitterions. Typically, in zwitterionic stationary phases the linked polar group combines a quaternary ammonium group and a sulfonic group (as disclosed, for example, in Garcia-Gómez et al., *Stationary phases for separation of nucleosides and nucleotides by hydrophilic interaction liquid chromatography*, Trends Anal. Chem., 2013, 47, 111-128 or in *A practical guide to HILIC, including ZIC®-HILIC applications*, Editor: T. Jonsson, Merck SeQuant, 2009).

In a preferred embodiment of the invention a zwitterionic stationary phase is used.

These types of columns, suitable for HILIC, are widely available commercially.

For example, the commercially available zwitterionic HPLC column ZIC®-pHILIC (Merck SeQuant AB) can be used.

The mobile phase is a mixture of acetonitrile (mobile phase A) and an aqueous solution of ammonium acetate (mobile phase B).

Generally, the concentration of ammonium acetate in mobile phase B is comprised between 10 and 40 mM, preferably between 15 and 35 mM, more preferably between 20 and 30 mM, still more preferably is about 25 mM, and still more preferably is 25 mM.

The elution time of the mobile phase is generally comprised between 45 and 60 minutes, preferably is about 50 minutes, and more preferably is 50 minutes.

The flow rate of the mobile phase is generally comprised between 0.7 and 1 ml/min, preferably is about 0.8 ml/min, and more preferably is 0.8 ml/min.

The mobile phase runs through the stationary phase according to a gradient elution mode, i.e., the composition of the mobile phase changes during the run, namely, the proportion between mobile phase A (acetonitrile) and mobile phase B (aqueous solution of ammonium acetate) (A:B) in the solvent mixture changes during elution.

Preferably said gradient involves changing from an initial A:B ratio of about 85:15 (t=0) to a ratio A:B of about 40:60 at about 35 minutes, and subsequently back to about 85:15 at the end of the elution time.

In a preferred embodiment, the initial and final ratio A:B, which is preferably about 85:15, is maintained constant for a short period of time, for example comprised between 3 and 15 minutes, at the beginning and/or at the end of the elution; more preferably, the ratio 85:15 is maintained constant:

at the beginning of elution for about 3 to 8 minutes, preferably for about 4 to 6 minutes, more preferably for about 5 minutes and still more preferably for 5.0 minutes; and/or at the end of elution for about 8 to 15 minutes, preferably for about 10 to 12.5 minutes, more preferably for about 12 minutes, and still more preferably for 11.9 minutes.

In another preferred embodiment, the lowest ratio A:B, which is preferably about 40:60, and which is reached preferably at about 35 minutes, is maintained constant for a short period of time, typically comprised between 2 and 5 minutes, preferably for about 3 minutes, before turning back to the highest A:B ratio, which is preferably about 85:15. More preferably, the ratio A:B of about 40:60 is maintained constant for about 3 minutes approximately from time point 35 minutes to time point 38 minutes.

In a particularly preferred embodiment of the invention, the elution time is 50 minutes, and the gradient expressed as the ratio between mobile phase A and mobile phase B at each time point is: 85:15 (0 min), 85:15 (5.0 min), 40:60 (35.0 min), 40:60 (38.0 min), 85:15 (38.1 min) and 85:15 (50.0 min).

The only known reported substances expected to be determined by means of the analytical method of the present invention were fosfomycin, impurity A, as well as possible excipients when the sample is a fosfomycin pharmaceutical composition.

However, the authors of the present invention observed that, surprisingly, using the analytical method of the invention an optimal separation between fosfomycin and its impurities and/or degradation products are achieved. Thus, as disclosed in the Examples, it is possible to separate more than 10 different substances (see Table 9), including the "impurity A".

For identifying and quantifying fosfomycin, impurity A and the known excipients, pure reference substances can be used, and suitable calibration is generally performed starting from the known reference standard samples. Alternatively, the calibration may be done using mixtures of reference standards, to avoid a possible matrix effect. For example, the calibration of impurity A can be done with a sample containing a mixture of impurity A and fosfomycin reference standards.

For quantifying other substances, it can be assumed that all impurities and degradation products have the same response factor as impurity A.

The substances to be used as reference standards in the method can be commercially obtained, and it is preferred that their purity is of at least 94%, more preferably at least 95%, still more preferably at least 96%, still more preferably at least 97%, still more preferably at least 98%, and still more preferably at least 99%.

The analytical method developed allows measuring concentrations of impurities or degradation products in fosfomycin samples as low as 0.10%.

Mass Spectrometry (MS)

In order to identify unknown substances detected by HILIC-CAD, mass spectrometry (MS) was used, using a combined LC-CAD-MS (liquid chromatography-charged aerosol detection-mass spectrometry) strategy.

Mass spectrometry is a well-known analytical technique which essentially is based on the generation of ions from compounds by any suitable method, the separation of these ions by their mass-to-charge ratio (m/z) and their detection. Generally, mass spectrometers consist of an ion source, a mass analyzer, and a detector which are operated under high vacuum conditions.

Tandem mass spectrometry (MS/MS) is advantageously used. MS/MS encompasses subjecting mass-selected ions to a second mass spectrometric analysis, according to a two combined stages of mass spectrometry (MS1 and MS2).

The principles and practical aspects of mass spectrometry are well known to the skilled person in chemical analysis and are also described in many reference books, for example, in *Mass Spectrometry. A textbook*. J. H. Gross, second edition, Springer, 2011.

Typically, a mass spectrum of a substance is the two-dimensional representation of signal intensity (ordinate) versus m/z (abscissa). The intensity of the peak correlates to the abundance of that ion. Often, the peak at highest m/z results from the detection of the intact ionized molecule, the molecular ion. The molecular ion peak is usually accompanied by several peaks at lower m/z caused by fragmentation of the molecular ion to yield fragment ions.

Figure 9:
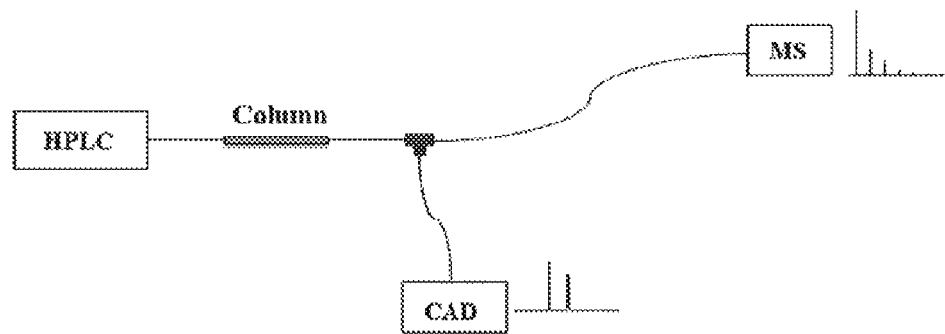
FIG. 9 shows a schematic representation of the coupling of HPLC column with a charged aerosol detector (CAD) and with a mass spectrometer (MS), according to a LC-CAD-MS combination procedure.

In the present method, mass spectrometry is employed in association with liquid chromatography, as a chromatographic detector, for identifying each substance eluted through its mass spectrum. More specifically, liquid chromatography is simultaneously coupled with a charged aerosol detector and mass spectrometer (LC-CAD-MS) with the purpose to identify the different substances eluted and detected in CAD. A scheme of the LC-CAD-MS apparatus is shown in FIG. 9.

Thus, the analyzed sample passes through the HILIC HPLC column, a Tee-mixer is applied as a diverting valve immediately after the column, so the post-column flow is split into the MS and CAD. Generally, the flow ratio between MS and CAD is about 1:2.

Uses of the Analytical Method of the Invention

The analytical method of the invention can be incorporated into a process for manufacturing fosfomycin or a pharmaceutically acceptable salt thereof, for ensuring that a pharmaceutical active ingredient of the required purity is obtained.

Therefore, another aspect of the present invention relates to a process for manufacturing fosfomycin or a pharmaceutically acceptable salt thereof having a specified purity degree, characterised in that it comprises the following steps:
  (i) providing a batch of fosfomycin or a pharmaceutically acceptable salt thereof;
  (ii) quantifying fosfomycin impurities and/or degradation products in a sample of the batch of step (i) using the method of the invention; and
  (iii) validating the batch only if the percentage of impurities in the sample fulfils the specified purity degree.

A further aspect of the present invention relates to fosfomycin or a pharmaceutically acceptable salt thereof having a specified purity degree, prepared by the following steps:
  (i) providing a batch of fosfomycin or a pharmaceutically acceptable salt thereof;
  (ii) quantifying fosfomycin impurities and/or degradation products in a sample of the batch of step (i) using the method of the invention; and
  (iii) validating the batch only if the percentage of impurities in the sample fulfils the specified purity degree.

The specified purity degree of fosfomycin or a pharmaceutically acceptable salt thereof may vary depending on the intended use or the applicable regulatory requirements. The purity degree may be expressed typically as a maximum allowable percentage of impurities, either referred to the total impurities or referred to a specific impurity in particular.

For providing the batch of fosfomycin or a pharmaceutically acceptable salt thereof, according to step (i), any source may be used, in particular, any synthetic process suitable for preparing fosfomycin or a pharmaceutically acceptable salt thereof can be used, optionally including a purification step.

Subsequently, in step (ii), a sample of the active ingredient is taken from the batch and is subjected to the analytical method of the invention, as described above, for quantifying the amount of impurities.

Finally, the percentage of impurities of the sample is compared to the required impurity degree; typically, it is assessed whether the percentage of impurities does not exceed the maximum allowed impurity degree. If such requirement is fulfilled the batch of fosfomycin or a pharmaceutically acceptable salt thereof is validated, i.e. it is classified as suitable for further use, namely, for being used as active pharmaceutical ingredient to be incorporated into pharmaceutical compositions.

If the sample does not fulfil the purity requirements, it is discarded, i.e. it is considered not suitable for being used as active pharmaceutical ingredient. The discarded batches may be subjected to purification process, for example.

Analogously, the analytical method of the invention can be incorporated into a process for manufacturing a pharmaceutical composition comprising fosfomycin or a pharmaceutically acceptable salt thereof and at least one pharmaceutically acceptable excipient, for ensuring that a pharmaceutical composition of the required purity is obtained.

Therefore, another aspect of the present invention relates to a process for manufacturing a pharmaceutical composition comprising fosfomycin or a pharmaceutically acceptable salt thereof and at least one pharmaceutically acceptable excipient having a specified purity degree, characterised in that it comprises the following steps:
(i) providing a batch of a pharmaceutical composition comprising fosfomycin or a pharmaceutically acceptable salt thereof and at least one pharmaceutically acceptable excipient;
(ii) quantifying fosfomycin impurities and/or degradation products in a sample of the batch of step (i) using the method of the invention; and
(iii) validating the batch only if the percentage of impurities fulfils the required purity requirements.

A further aspect of the present invention relates to a pharmaceutical composition comprising fosfomycin or a pharmaceutically acceptable salt thereof and at least one pharmaceutically acceptable excipient having a specified purity degree, prepared by the following steps:
(i) providing a batch of a pharmaceutical composition comprising fosfomycin or a pharmaceutically acceptable salt thereof and at least one pharmaceutically acceptable excipient;
(ii) quantifying fosfomycin impurities and/or degradation products in a sample of the batch of step (i) using the method of the invention; and
(iii) validating the batch only if the percentage of impurities fulfils the required purity requirements.

The batch of the pharmaceutical composition of step (i) may be either in bulk, i.e. typically non-packaged powder, tablets or capsules, or it may be a finished pharmaceutical composition within a suitable package, for example, powder for oral use in mono-dose sachets, or powder for injection in vials, or tablets or capsules in blisters or in bottles or other packages.

For providing the batch of a pharmaceutical composition comprising fosfomycin or a pharmaceutically acceptable salt thereof and at least one pharmaceutically acceptable excipient, according to step (i), any source may be used, in particular, said batch may be obtained using any standard manufacturing process, as are well-known in the pharmaceutical technology field, as described in well-known reference books in the field, for example, in the book *Aulton's Pharmaceutics. The design and manufacture of medicines*, M. E. Aulton and K. M. G. Taylor, editors, Churchill Livingstone Elsevier, Fourth Edition, 2013; or in the book *Remington Essentials of Pharmaceutics*, L. Felton, editor, Pharmaceutical Press, 2013; or in the book *Pharmaceutics. Basic principles and application to pharmacy practice.* A. K. Dash, S. Singh, and J. Tolman, editors, Academic Press, Elsevier, 2014.

Subsequently, in step (ii), a sample of the pharmaceutical composition is taken from the batch and is subjected to the analytical method of the invention, as described above, for quantifying the amount of impurities.

Finally, the percentage of impurities of the sample is compared to the required impurity degree; typically, it is assessed whether the percentage of impurities does not exceed the maximum allowed impurity degree, either referred to the total amount of impurities or to a specific impurity in particular. If such requirement is fulfilled the batch of the composition is validated, i.e. it is classified as suitable for safe use in therapy.

If the sample does not fulfil the purity requirements, it is discarded.

EXAMPLES

Example 1

HILIC-HPLC Method with CAD Detection: Quantification of Fosfomycin in Fosfomycin Samples The following fosfomycin samples were analysed:
Fosfomycin for injection drug product ("Fosfomycin DP"): vials containing sterile dry powder admixture of 6 g of fosfomycin (as 7.92 g of fosfomycin disodium) and 150 mg of succinic acid (1.86 wt %).
Fosfomycin for injection bulk drug product ("Fosfomycin BDP"): same dry powder admixture of fosfomycin disodium and succinic acid, in the same proportion (1.86 wt % succinic acid), but stored in drums, not yet conditioned in sterile vials.
Fosfomycin disodium active pharmaceutical ingredient ("Fosfomycin API")

Equipment Used

| | |
|---|---|
| HPLC: | Agilent 1100 or 1200 HPLC system with a column heater capable of maintaining 50 ± 2° C. |
| Column: | SeQuant ZIC ®-pHILIC 5 μm, polymeric 150 × 4.6 mm PEEK coated HPLC column, EMD Millipore Cat# 1504610001 |
| Detector: | Charged Aerosol Detector (CAD) detector, Corona Ultra or Corona Veo (Thermo) |

HPLC Method Operating Parameters:
Mobile phase A: Acetonitrile
Mobile phase B: 25 mM ammonium acetate
Flow rate: 0.8 ml/min
Injection volume: 12 μl
Column temperature: 50° C.
Autosampler temp: 5° C.
CAD: Nebulizer temperature: 30° C.
Collection rate: 10 Hz
Run time: 50 min
Gradient:

| Time (min) | % A | % B |
|---|---|---|
| 0 | 85 | 15 |
| 5 | 85 | 15 |
| 35 | 40 | 60 |
| 38.0 | 40 | 60 |
| 38.1 | 85 | 15 |
| 50.0 | 85 | 15 |

Reagents/Reference Standards
High purity water (Milli-Q)
Acetonitrile, Fisher, Optima LC/MS grade
Ammonium Acetate, Fisher, HPLC/ACS grade
Sample diluent: 1:1 (v/v) mixture of mobile phase A:mobile phase B
Succinic acid, Sigma-Aldrich, BioXtra≥99.0%
Fosfomycin disodium salt reference standard ("Fosfomycin RS") (Ercros) (overall purity 98.8 wt %)

Preparation of Mobile Phase B
Mobile Phase B is 25 mM ammonium acetate, pH is about 6.8, though pH measurement is not required. 3.9 g of ammonium acetate were added to 2000 ml volumetric flask and water was added until total volume 2000 ml.

Preparation of Succinic Acid Solutions

Succinic acid stock solution ("20× Succinic acid") was prepared as follows: 84±1 mg of succinic acid were weighed into a 100 ml volumetric flask; about 40 ml of mobile phase B were added and mixed until dissolved; about 40 ml of mobile phase A (acetonitrile) were subsequently added and mixed; and q.s. sample diluent was finally added up to a volume of 100 ml.

"Succinic vehicle" solution was prepared transferring 0.5 ml of 20× Succinic acid solution to a 10 ml volumetric flask, and adding sample diluent up to a volume of 10 ml. The concentration of the succinic vehicle solution was 0.04 mg/ml. The solution was stored at 5° C.

Preparation and Calibration of Fosfomycin Disodium Standard Solution

Fosfomycin disodium standard solution ("Stock Standard") at 2.75 mg/ml was prepared as follows: 55±1 mg of Fosfomycin RS were weighed into a 20 ml volumetric flask; 10 ml of mobile phase B were added and mixed until dissolved, then 10 ml of mobile phase A were added and mixed, and q.s. sample diluent (1:1 mixture mobile phases A and B) was finally added to a volume of 20 ml. The solution was stored at 5° C.

The molar concentration of fosfomycin disodium in the stock solution was 14.92 mM, and it was calculated taking into account the water content of Fosfomycin RS (0.03 wt %) and the overall purity of Fosfomycin RS (98.8 wt %).

Calibration of the standard solution was performed over the range of 75% to 125% of the assay concentration. The calibration was used to quantitate the weight contribution of fosfomycin in samples.

100% linearity standard solution was prepared diluting 4 ml of "Stock Standard" with sample diluent to 5 ml (final concentration 11.9 mM). The solution was stored at 5° C. Additional solutions were prepared as disclosed in Table 1 (at 125% the Stock Standard solution is used directly to prepare an HPLC sample):

TABLE 1

| Name | Fosfomycin conc. (mM) | Stock Standard A (ml) | Final Volume | % Nominal (assay conc.) |
|---|---|---|---|---|
| Lin. Std 75.0 | 9.0 | 3 | 5 | 75 |
| Lin. Std 87.5 | 10.4 | 3.5 | 5 | 87.5 |
| Lin. Std 100.0 | 11.9 | 4 | 5 | 100 |
| Lin. Std 112.5 | 13.4 | 4.5 | 5 | 112.5 |
| Lin. Std 125.0 | 14.9 | 1 | — | 125 |

A calibration curve was created by plotting peak area against theoretical amount (mM) of active ingredient (fosfomycin) and impurity A. A second-order polynomial equation was used to fit the data:

$$F(x) = c + bx + ax^2$$

Where a, b, and c are calibration coefficients.

Sample Preparations

For preparing fosfomycin disodium API sample (Fosfomycin API), 44±1 mg of Fosfomycin API were weighed into a 20 ml volumetric flask, 10 ml of mobile phase B were added and stirred until dissolution, then 10 ml of mobile phase A were added and mixed, and finally q.s. of sample diluent (1:1 mixture mobile phases A and B) was added to a volume of 20 ml. The solution was labelled as "Working Sample API" and was stored at 5° C.

For preparing the fosfomycin drug product sample (Fosfomycin DP) the contents of a vial of the drug powder, containing 6 g of fosfomycin (as 7.92 g of fosfomycin disodium) and 150 mg of succinic acid (1.86% w/w) were dissolved in mobile phase B up to a volume of 250 ml. 10 ml of this solution was transferred to a 150 ml volumetric flask, 10 ml of mobile phase A (acetonitrile) was added, and diluent solution was added up to 150 ml. The test solution was approximately 11.8 mM as pure fosfomycin free acid. It was labelled as "Working Sample DP" and stored at 5° C.

For preparing bulk drug product (BDP) sample (Fosfomycin BDP), 45±1 mg of fosfomycin bulk drug product were first dissolved with 10 ml of mobile phase B in a 20 ml volumetric flask, then 10 ml of mobile phase A were added, and finally q.s. sample diluent was added to a volume of 20 ml. The solution was labelled as "Working Sample BDP" and stored at 5° C.

Results

Fosfomycin was identified in test sample chromatograms when the retention time was within ±5% of the average retention time of the standard fosfomycin peaks (n=6) in the standard solution.

Based on the calibration with fosfomycin standard, the concentration in mM of drug in unknown samples was calculated from known equations, based on the main peak area, and using the dilution factor (DF) to determine the concentration (mM) of fosfomycin in the original sample (stock test solution):

Fosfomycin concentration $$\text{Concentration } (mM) = \left( \frac{-b + \sqrt{b^2 - 4a(c - \text{peak area})}}{2a} \right) \times DF \quad \text{Equation 1}$$

Where:
a, b, c = Coefficients as defined by the second-order polynomial calibration
DF = 1 for API
DF = 1 for bulk drug product (BDP)
DF = 15 for drug product (DP)

Amount of fosomycin in Finished Drug Products $$Fosfomycin_{free\ acid}(\text{mg}) = Conc(\text{mM}) \times (Vol.) \times \left( MW \frac{\text{mg}}{\text{mmol}} \right) \quad \text{Equation 2}$$

Where:
Conc. = Concentration (mM) of fosfomycin free acid equivalents based on Equation 1
Vol. = Volume of original DP working test solutions (0.250 l for DP vials)
MW = 138.06 mg/mmol (fosfomycin as free acid in finished DP)

Amount of fosfomycin in Bulk Drug Products and API $$Fosfomycin_{disodium}(\text{mg}) = Conc(\text{mM}) \times (Vol.) \times \left( MW \frac{\text{mg}}{\text{mmol}} \right) \quad \text{Equation 3}$$

Where:
Conc. = Concentration (mM) of fosfomycin disodium based on Equation 1
Vol. = Volume of API and Bulk DP working test solutions (0.020 l for BDP and API)
MW = 182.02 mg/mmol (fosfomycin as disodium salt in API and BDP)

Percent label claim for Finished Drug Product

% Label claim =

$$\frac{\text{Observed pure } Fosfomycin_{anion} \text{ amt.(mg)}}{Fosfomycin_{anion} \text{ amt. (mg) as per label}} \times 100 \quad \text{Equation 4}$$

Expected amount of fosfomycin in BDP and API (corrected with % moisture and % purity)

Expected $Fosfomycin_{disodium}$(mg) = Sample weight (mg) ×     Equation 5

$$\left(\frac{100 - \% \text{ moisture}}{100}\right) \times \left(\frac{100 - \% \text{ succinic acid}}{100}\right) \times \left(\frac{\% \text{ purity}}{100}\right)$$

Where %succinic acid is 1.86% for BDP and 0% for API

Percent content for API and BDP

% Content =     Equation 6

$$\frac{\text{Observed pure } Fosfomycin_{disodium} \text{ amt. (mg)}}{\text{Expected } Fosfomycin_{disodium}(\text{mg})} \times 100$$

Figure 2:
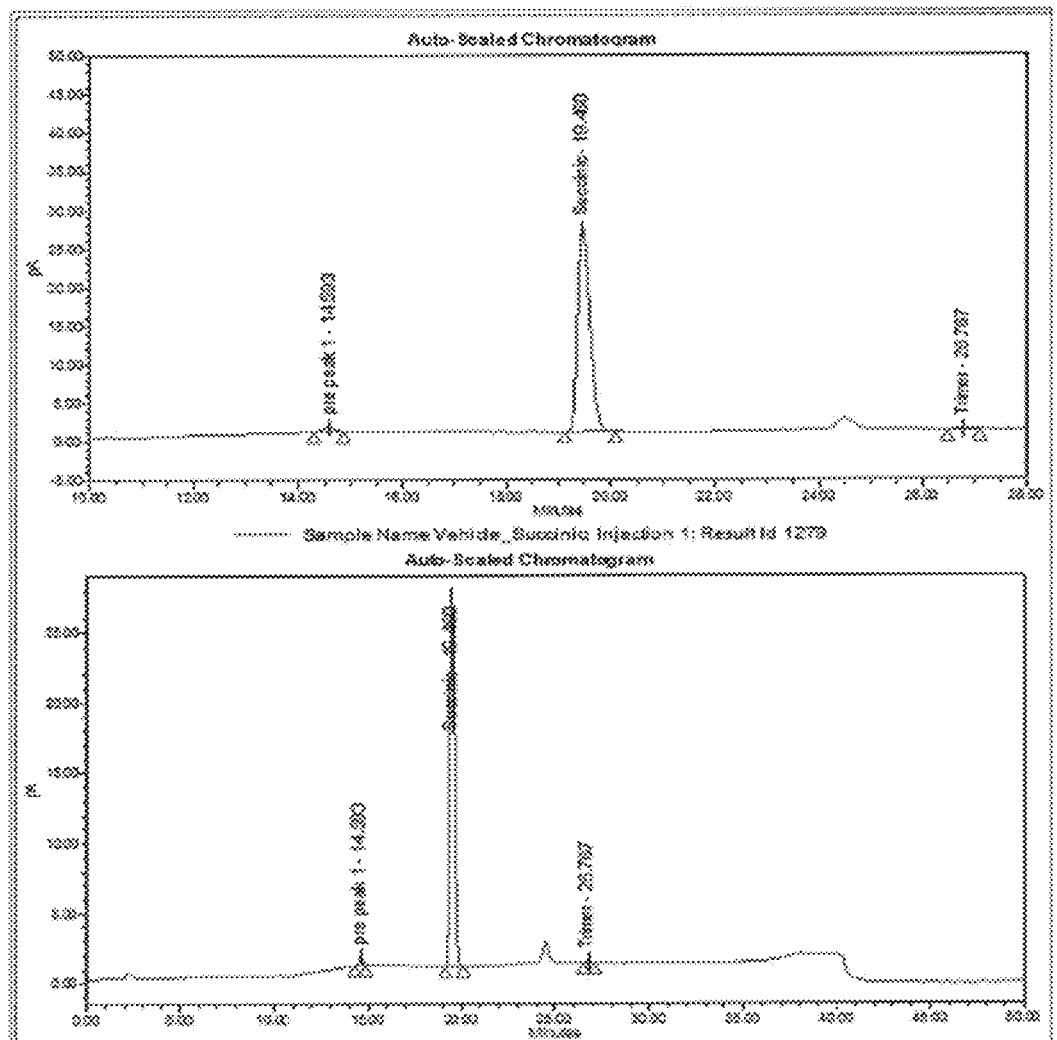
FIG. 2 shows a representative chromatogram by HILIC-HPLC-CAD of succinic vehicle solution (0.040 mg/ml succinic acid) (Example 1). The x-axis represents the retention time (in minutes) and the y-axis indicates the detector response (peak area).
Figure 3:
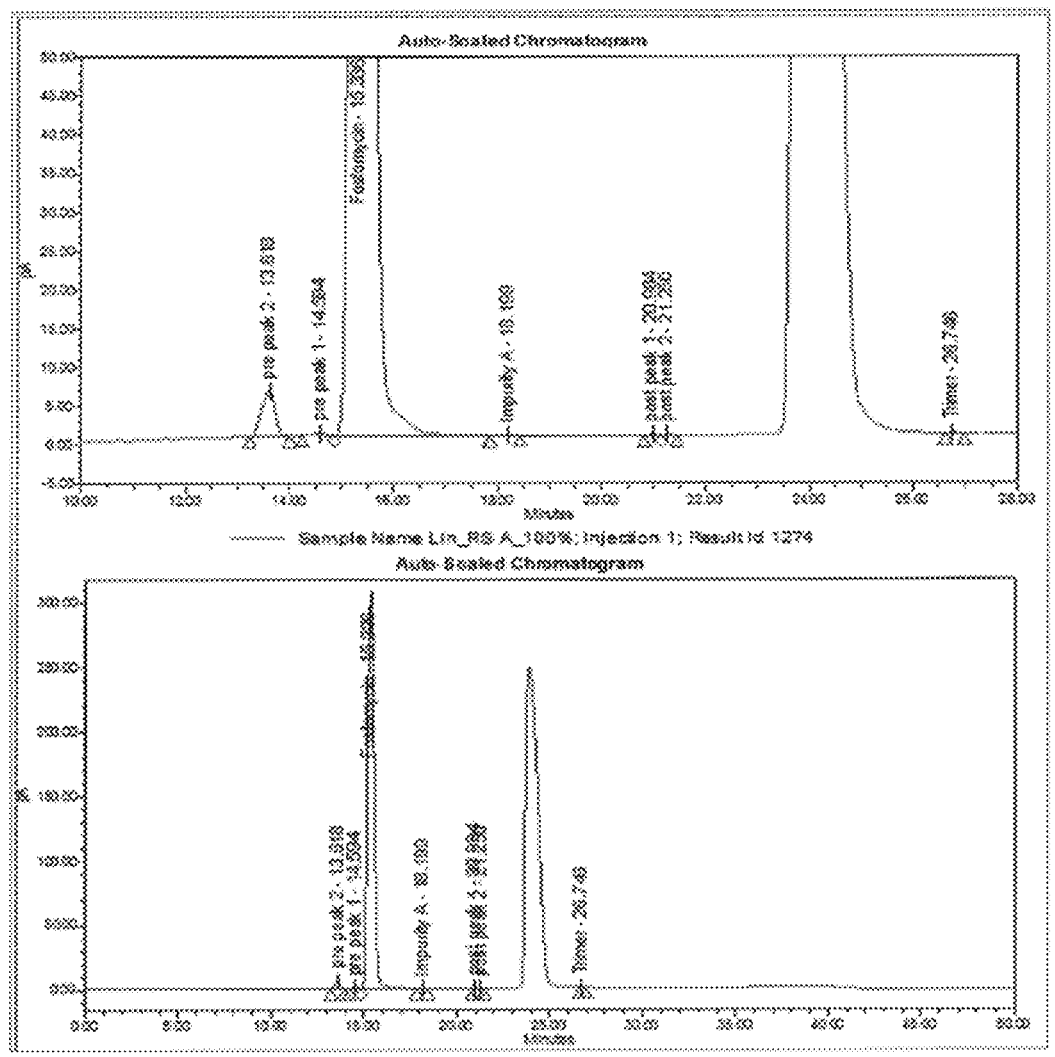
FIG. 3 shows a representative chromatogram by HILIC-HPLC-CAD of Fosfomycin disodium Reference Standard (Example 1). The x-axis represents the retention time (in minutes) and the y-axis indicates the detector response (peak area).
Figure 4:
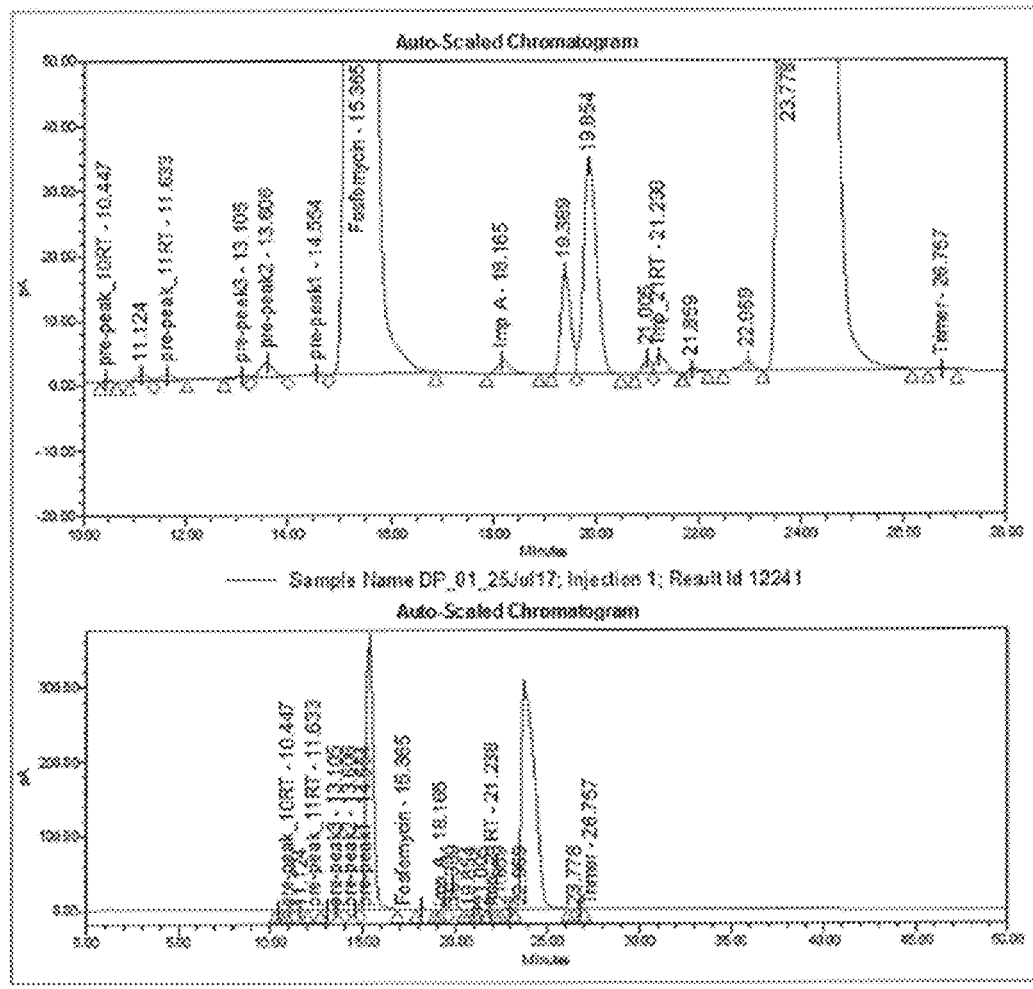
FIG. 4 shows a representative chromatogram by HILIC-HPLC-CAD of a sample of fosfomycin for injection drug product consisting in vials containing sterile dry powder admixture of 6 g of fosfomycin (as 7.92 g of fosfomycin disodium) and 150 mg of succinic acid (1.86 wt %) (Example 1). The x-axis represents the retention time (in minutes) and the y-axis indicates the detector response (peak area).

Where:
  Observed Fosfomycin=Observed amount (mg) of fosfomycin disodium based on Equation 3
  Expected Fosfomycin=Expected amount (mg) of fosfomycin disodium based on Equation 5
  For illustrative purposes, FIGS. 1 to 4 show some obtained chromatograms, wherein the x-axis represents the retention time (in minutes) and the y-axis indicates the detector response (peak area):
  Diluent (25 mM ammonium acetate in acetonitrile, 50:50, v/v (FIG. 1). The following peaks are shown: 15.968 and 26.779 (trimer).
  Succinic vehicle solution (0.040 mg/ml succinic acid) (FIG. 2). The following peaks are shown: 14.593 (pre peak 1), 19.460 (succinic acid) and 26.767 (trimer).
  Fosfomycin RS at 100% (FIG. 3). The following peaks are shown: 13.618 (pre peak 2), 14.594 (pre peak 1), 15.336 (fosfomycin), 18.199 (impurity A), 20.984 (post peak 1) and 21.250 (post peak 2) and 26.746 (trimer).
  Fosfomycin DP at 100% (FIG. 4). The following peaks are shown: 10.447 (pre-peak_10RT), 11.124, 11.633 (pre-peak_11RT), 13.105 (pre-peak3), 13.606 (pre-peak2), 14.554 (pre-peak1), 15.365 (fosfomycin), 18.165 (impurity A), 19.389, 19.854, 21.005, 21.238 (impurity_21RT), 21.859, 22.969, 23.778 and 26.757 (trimer).

Example 2

HILIC-HPLC Method with CAD Detection: Quantification of Impurities and Degradation Products in Fosfomycin Samples The equipment, HPLC operating parameters reagents, reference standards, mobile phase A and B and sample diluent were the same as disclosed in Example 1. The only differences were that, in this case, the CAD detector used was specifically Corona Veo and the injection volume was 25 μl, instead of 12 μl.

Furthermore, in this example, the following additional reference standard was used:
  Impurity A reference standard (Impurity A RS): P-[(1R, 2R)-1,2-dihydroxypropyl)]-phosphonic acid, ammonium salt (Toronto Research Chemicals). $C_3H_7O_5P$ $(NH_3)_2$; MW=190.14 (overall purity 94.6 wt %).
  The succinic acid solutions ("20× Succinic acid" and "Succinic vehicle" solutions) were prepared analogously as disclosed in Example 1.
  Thus, for preparing "20× Succinic acid" solution, 84±1 mg of succinic acid were weighed into 100 ml volumetric flask, 40 ml of mobile phase B were added and mixed until dissolved, 40 ml of mobile phase A were subsequently added and mixed, and finally q.s. of sample diluent was added to 100 ml.
  For preparing the "succinic vehicle" solution, 0.5 ml of "20× Succinic acid" were added into 10 ml volumetric flask and q.s. of sample diluent was added to 10 ml.
  The fosfomycin samples analysed were:
    Fosfomycin for injection drug product ("Fosfomycin DP"): vials containing sterile dry powder admixture of 6 g of fosfomycin (as 7.92 g of fosfomycin disodium) and 150 mg of succinic acid (1.86 wt %).
    Fosfomycin for injection bulk drug product ("Fosfomycin BDP"): same dry powder admixture of fosfomycin disodium and succinic acid, with the same proportion (1.86 wt % succinic acid), but not contained in sterile vials.
    Fosfomycin disodium active pharmaceutical ingredient ("Fosfomycin API") In this Example, also non-sterile fosfomycin API samples were analysed, having higher level of impurities, as a fingerprint for impurity peak naming.

Preparation and Calibration of Impurity A Standard Solution
  Impurity A stock standard solution ("Impurity A Stock") was prepared, at 11 mM. 47±1 mg of fosfomycin Impurity A ammonium salt were dissolved into a 20 ml volumetric flask, by first adding 10 ml of mobile phase B until dissolution, then adding 10 ml of mobile phase A, and finally adding q.s. of sample diluent up to a volume of 20 ml. The solution was labelled as "Impurity A Stock" and stored at 5° C.
  The molar concentration of impurity A in the impurity A stock standard solution was 10.98 mM, and it was calculated taking into account the water content of impurity A RS (6.1 wt %) and the overall purity of Impurity A RS (94.6 wt %).
  Impurity A working standard solution ("LL Std 2") was prepared diluting 2.0 ml of Impurity A Stock with sample diluent to 100 ml (final concentration 0.230 mM). The solution was stored at 5° C.
  Starting from Impurity A Working Standard ("LL Std 2"), low level linearity standards (LL Std) were prepared using sample diluent as disclosed in Table 2. A calibration based on these standards was used to quantitate the weight contribution of impurities in samples, both as impurity A as well as other unknown impurities.

TABLE 2

| Name | Impurity A conc. (mM) | Impurity A Working Standard (ml) | Final Volume | % Nominal (assay conc.) |
|---|---|---|---|---|
| LL Std 0.05 | 0.0057 | 0.5 | 20 | 0.05 |
| LL Std 0.10 | 0.0115 | 1 | 20 | 0.1 |
| LL Std 0.20 | 0.0230 | 2 | 20 | 0.2 |
| LL Std 0.50 | 0.0574 | 5 | 20 | 0.3 |

The LL Std 0.5, 0.10, 0.20, and 0.50 were used as a five point calibration for Impurity A low level peak response, by plotting peak area against theoretical concentration (mM).

Sample Preparations

API samples (Fosfomycin API), were prepared analogously as disclosed in Example 1, labelled as "Working Sample API" and stored at 5° C.

A "Resolution sample API" was analogously prepared, but using the non-sterile API, which had higher levels of impurities and was used for screening the columns based on resolution and as a fingerprint for impurity peak naming.

For preparing the fosfomycin drug product sample (Fosfomycin DP) one vial containing 6 g of fosfomycin (as 7.92 g of fosfomycin sodium) and 150 mg of succinic acid (1.86% w/w) was opened and 45±1 mg of Fosfomycin DP were dissolved adding first 10 ml of mobile phase B into a 20 ml volumetric flask, then 10 ml of mobile phase A, and finally adding sample diluent up to 20 ml. It was labelled as "Working Sample DP" and stored at 5° C.

Fosfomycin BDP samples were prepared as disclosed in Example 1, and the solution was labelled as "Working Sample BDP" and stored at 5° C.

Peak Labelling

Peak labelling was based on the impurity peak identification study LC/MS/MS of Example 3. Peak labelling was slightly different for API and for DP and BDP because the latter contained succinic acid, so there were some succinic acid related impurity peaks in DP and BDP, but not in API.

Non-sterile API samples contained high level of most impurities (see FIG. 7) and could be used as a fingerprint for additional guidance with impurity peak naming.

Peaks which could not be identified were labelled as "unknown" with the RT and RRT.

Results

The impurity peaks and other major peaks identification/labelling for Fosfomycin API sample are shown in Table 3.

TABLE 3

| # of impurity peak | RT (min) | RRT | Peak names |
|---|---|---|---|
| 1 | 10.5 | 0.69 (0.67-0.70) | Ethanol adduct |
| 2 | 10.8 | 0.73 (0.70-0.73) | Saturated olefinic acid + Ethanol adduct |
| 3 | 11.6 | 0.76 (0.75-0.76) | Saturated olefinic acid |
| 4 | 13.0 | 0.86 (0.84-0.87) | Olefinic acid related compound |
| 5 | 13.5 | 0.90 (0.88-0.90) | Olefinic acid |
| 6 | 14.5 | 0.95 (0.93-0.97) | Methanol adduct |
|  | 15.4 | 1.00 | Fosfomycin |
| 7 | 17.9 | 1.18 (1.12-1.20) | Impurity A |
| 8 | 20.5 | 1.37 (1.34-1.39) | Dimer 1 |
| 9 | 20.7 | 1.38 (1.35-1.41) | Dimer 2 |
| 10 | 21.4 | 1.42 (1.40-1.42) | Dimer 3 |
| 11 | 21.6 | 1.44 (1.42-1.47) | Dimer 4 |
| 12 | 22.5 | 1.50 (1.45-1.52) | Dimer 5 |
| 13 | 23.2 | 1.52 (1.49-1.53) | Dimer 6 |
|  | 24.4 | 1.58 | Sodium |
| Few rare impurities in API | | | |
| 1 | 19.8 | 1.30 (1.27-1.31) | Olefinic acid adduct + methanol adduct of dimer |

The impurity peaks and other major peaks identification/labelling for Fosfomycin DP and Fosfomycin BDP are shown in Table 4:

TABLE 4

| # of impurity peak | RT (min) | RRT | Peak names |
|---|---|---|---|
| 1 | 10.5 | 0.69 (0.67-0.70) | Ethanol adduct |
| 2 | 10.8 | 0.73 (0.70-0.73) | Saturated olefinic acid + Ethanol adduct |
| 3 | 11.6 | 0.76 (0.75-0.76) | Saturated olefinic acid |
| 4 | 13.0 | 0.86 (0.84-0.87) | Olefinic acid related compound |
| 5 | 13.5 | 0.90 (0.88-0.90) | Olefinic acid |
| 6 | 14.5 | 0.95 (0.93-0.97) | Methanol adduct |
|  | 15.4 | 1.00 | Fosfomycin |
| 7 | 17.9 | 1.18 (1.12-1.20) | Impurity A |
|  | 19.4 | 1.24 | Succinic acid 1 |
|  | 19.7 | 1.25 | Succinic acid 2 |
| 8 | 20.5 | 1.37 (1.34-1.39) | Dimer 1 |
| 9 | 20.7 | 1.38 (1.35-1.41) | Dimer 2 |
| 10 | 21.4 | 1.42 (1.40-1.42) | Dimer 3 |
| 11 | 21.6 | 1.44 (1.42-1.47) | Dimer 4 |
| 12 | 22.5 | 1.50 (1.45-1.52) | Dimer 5 + Succinic acid adduct |
|  | 24.4 | 1.58 | Sodium |
| 14 | 26.2 | 1.68 (1.65-1.70) | Trimer |
| 15 | 26.8 | 1.73 (1.70-1.77) | Succinic acid bridged fosfomycin dimer |
| Few rare impurities in DP | | | |
| 1 | 19.8 | 1.30 (1.27-1.31) | Olefinic acid adduct |

The retention time of the Impurity A in test sample solutions was ±5% of the average retention time of the standard impurity A peaks (n=6) in the standard solutions.

A calibration curve was created by plotting peak area against theoretical concentration (mM) of impurity A in the low-level calibration (levels include 0%, 0.05%, 0.10%, 0.20%, and 0.50%). A second order polynomial equation was used:

$$F(x) = c + bx + ax^2$$

Where a, b and c are calibration coefficients.

Based on the calibration with impurity A standard, the concentration in mM of each impurity in an unknown sample could be calculated based on each impurity's peak area, taking into account the dilution factor (DF) to determine the concentration (mM) of each impurity in the original sample (stock test solution), by the following formula:

$$\text{Concentration } (mM) = \left( \frac{-b + \sqrt{b^2 - 4a(c - \text{peak area})}}{2a} \right)$$

Where a, b, c are coefficients as defined by the second-order polynomial calibration.

The weight contribution of each unknown impurity in the original sample could be calculated using the following formula (this calculation assumed that all the impurities have the same response factor as impurity A):

$$\text{Impurity } amt. \text{ (mg)} = Conc(\text{mM}) \times (Vol.) \times \left(\text{MW} \frac{\text{mg}}{\text{mmol}}\right)$$

Where:
Conc.=Concentration (mM) of each impurity based on Impurity A standard calibration
Vol.=Volume of original working test solutions (0.020 I for DP, BDP and API samples)
MW=154.06 mg/mmol (Impurity A as free acid)
For API samples, the dry fosfomycin amount is calculated based on the measured water content, according to the following formula:

$$\text{dry Fosfomycin } amt. \text{ (mg)} =$$
$$API \text{ sample weight (mg)} \times \frac{100 - Water_{sample\,API}}{100} \times \frac{138.06}{182.02}$$

For DP and BDP samples, the dry fosfomycin amount can be calculated according to the following formula:

$$\text{dry Fosfomycin } amt. \text{ (mg)} =$$
$$DP \text{ sample weight (mg)} \times \frac{100 - Water_{sample\,API}}{100} \times \frac{100 - 1.86}{100} \times \frac{138.06}{182.02}$$

Where 1.86 is the percentage of succinic acid excipient in DP/BDP formulations and 138.06/182.02 is the weight fraction of fosfomycin free acid in fosfomycin disodium sample.

The individual weight percent of each impurity and the weight percent of all impurities in API, BDP and DP samples were calculated relative to the dry fosfomycin free acid amount, using the following formulas:

$$\text{Impurity \%} = \frac{\text{Impurity } amt. \text{ (mg)}}{\text{dry Fosfomycin } amt. \text{ (mg)}} \times 100$$

$$\text{Total Impurity \%} = \frac{\sum \text{Impurity } amt. \text{ (mg)}}{\text{dry Fosfomycin } amt. \text{ (mg)}} \times 100$$

Figure 5:
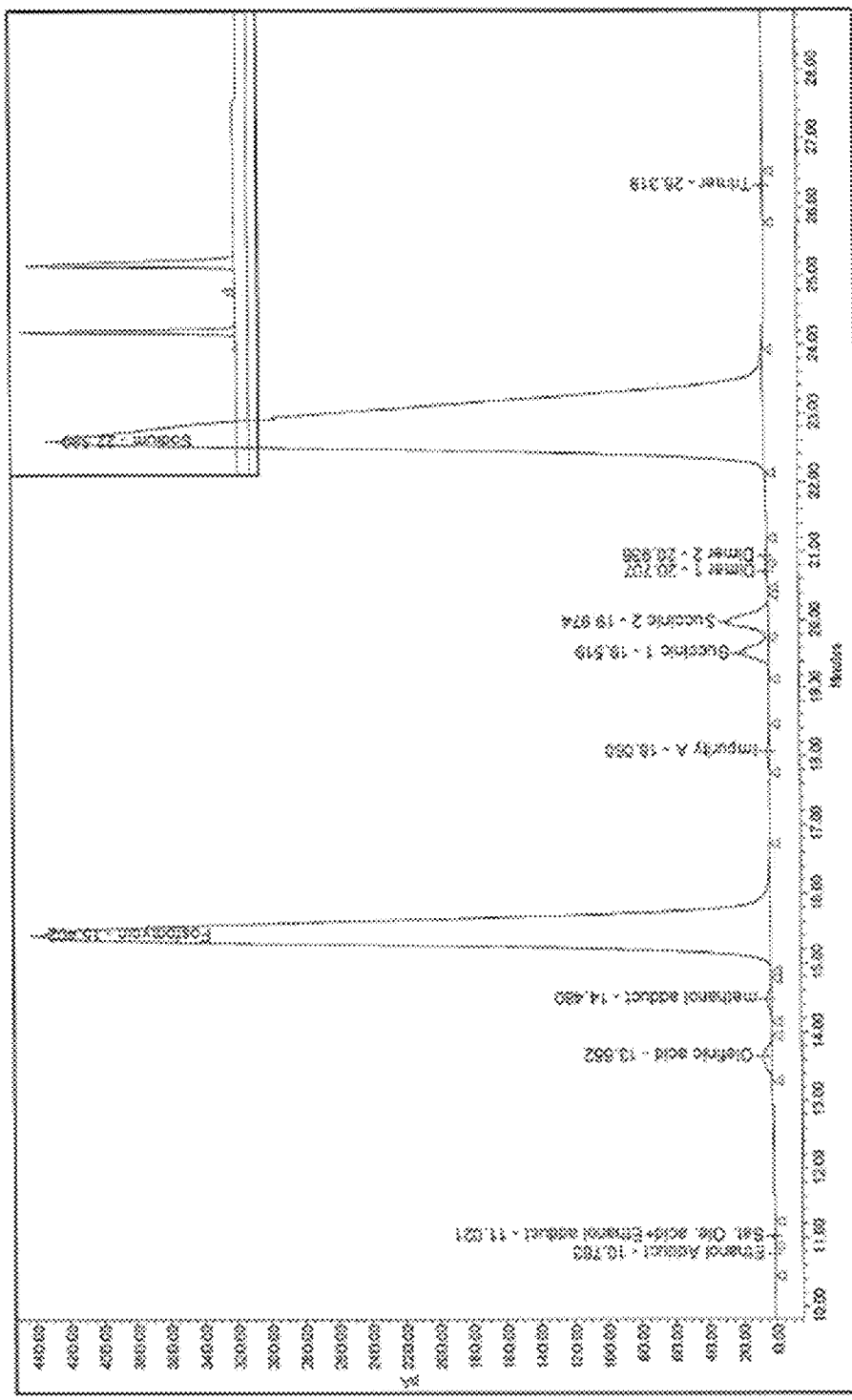
FIG. 5 shows a representative chromatogram by HILIC-HPLC-CAD of a sample of fosfomycin for injection drug product consisting in vials containing sterile dry powder admixture of 6 g of fosfomycin (as 7.92 g of fosfomycin disodium) and 150 mg of succinic acid (1.86 wt %) (Example 2). The x-axis represents the retention time (in minutes) and the y-axis indicates the detector response (peak area).

For illustrative purposes, some representative chromatograms are shown in the annexed FIGS. 5 to 8, wherein the x-axis represents the retention time (in minutes) and the y-axis indicates the detector response (peak area):

Fosfomycin disodium DP (FIG. 5). The following peaks are shown: 10.763 (ethanol adduct), 11.021 (saturated olefinic acid+ethanol adduct), 13.652 (olefinic acid), 14.480 (methanol adduct), 15.402 (fosfomycin), 18.060 (impurity A), 19.519 (succinic 1), 19.974 (succinic 2), 20.707 (dimer 1), 20.936 (dimer 2), 22.589 (sodium) and 26.319 (trimer).

Figure 6:
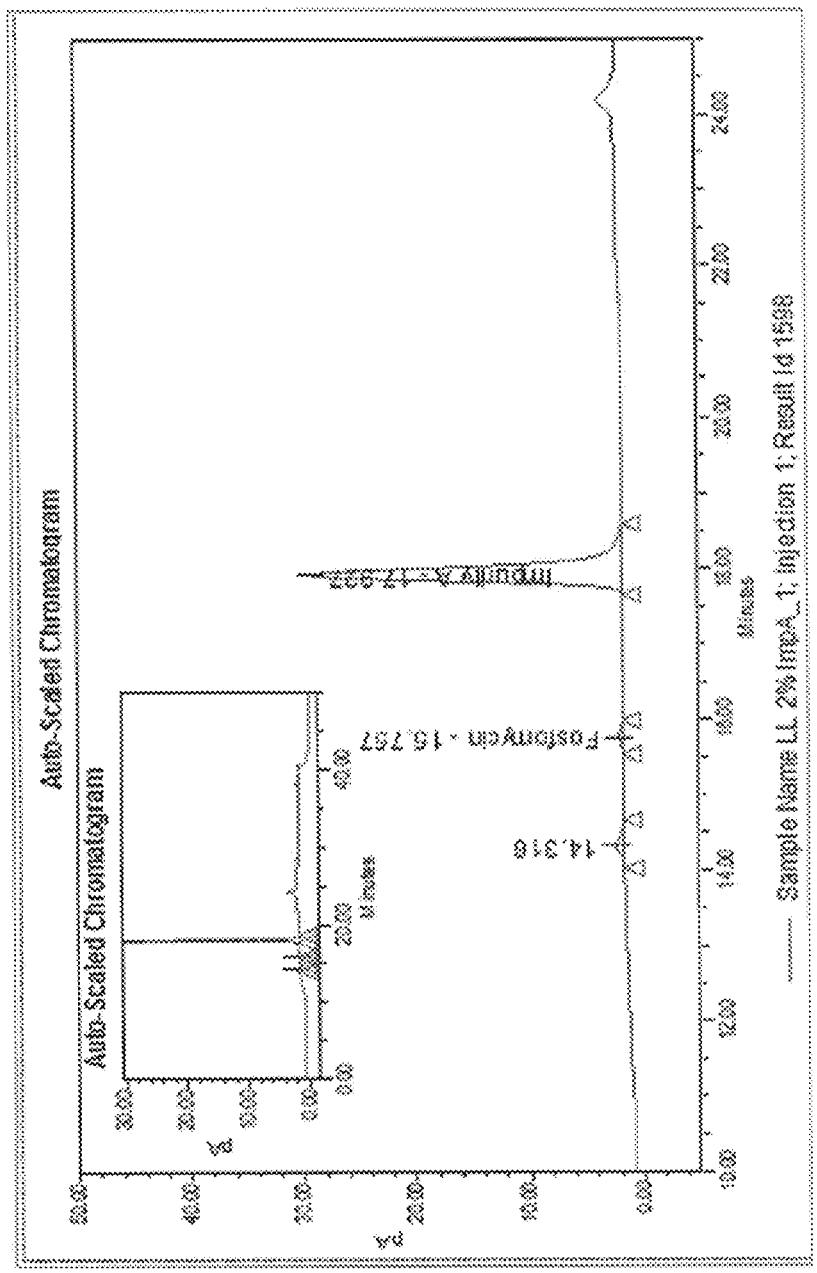
FIG. 6 shows a representative chromatogram by HILIC-HPLC-CAD of impurity A Reference Standard (Example 2). The x-axis represents the retention time (in minutes) and the y-axis indicates the detector response (peak area).

Impurity A RS at 2% (FIG. 6). The following peaks are shown: 14.316, 15.757 (fosfomycin) and 17.927 (impurity A).

Figure 7:
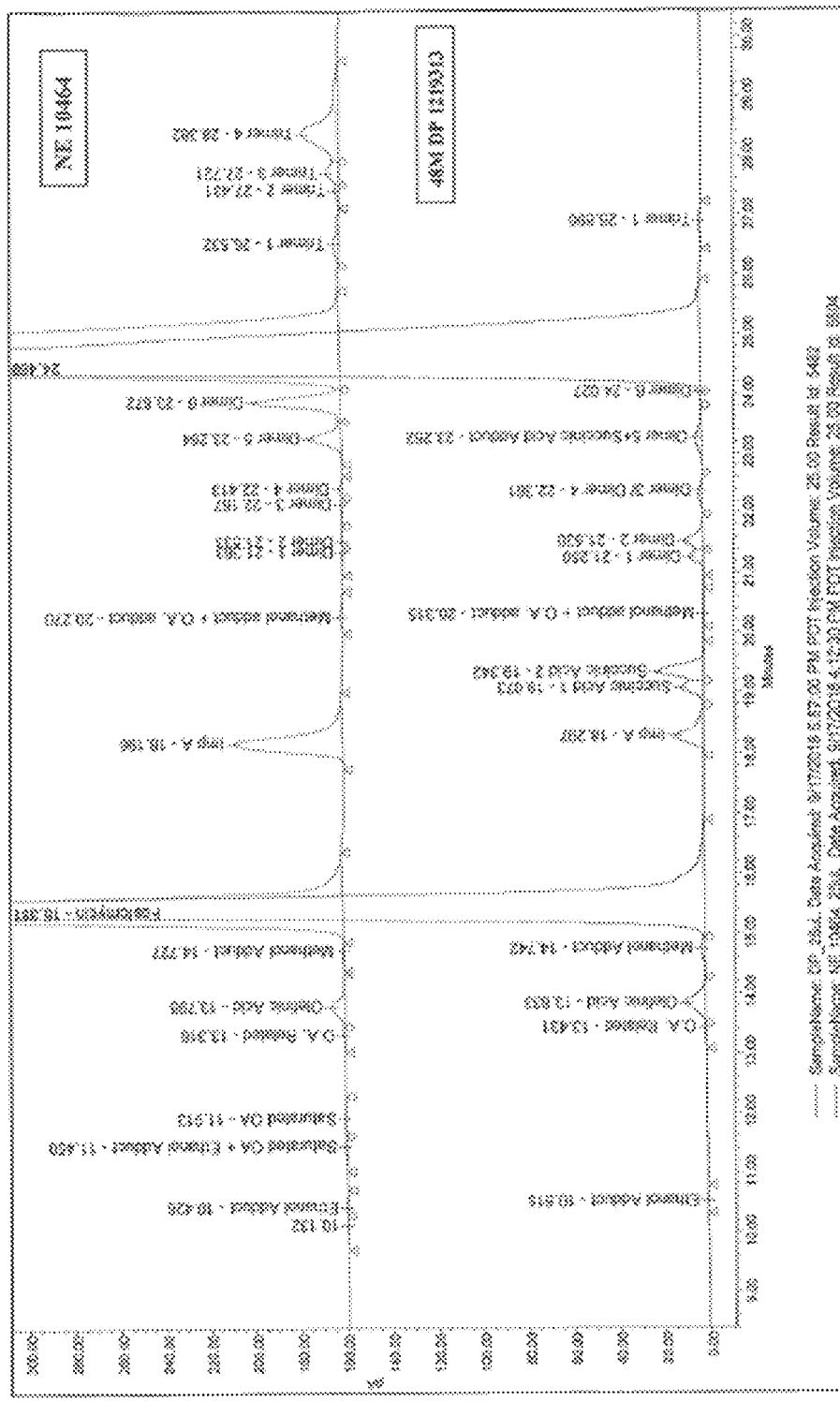
FIG. 7 shows a representative chromatogram by HILIC-HPLC-CAD of an aged sample of fosfomycin for injection drug product (admixture of fosfomycin disodium and 1.86 wt % succinic acid) and non-sterile fosfomycin disodium active substance alone (Example 2). The x-axis represents the retention time (in minutes) and the y-axis indicates the detector response (peak area).

Fosfomycin disodium API (non-sterile) and DP (aged) samples (FIG. 7). In the first chromatogram the following peaks are shown: 10.132, 10.426 (ethanol adduct), 11.450 (saturated olefinic acid+ethanol adduct), 11.913 (saturated olefinic acid), 13.316 (olefinic acid related), 13.798 (olefinic acid), 14.727 (methanol adduct), 15.357 (fosfomycin), 18.196 (impurity A), 20.270 (methanol adduct+olefinic acid adduct), 21.363 (dimer 1), 21.533 (dimer 2), 22.167 (dimer 3), 22.413 (dimer 4), 23.264 (dimer 5), 23.872 (dimer 6), 24.460, 26.532 (trimer 1), 27.431 (trimer 2), 27.721 (trimer 3) and 28.382 (trimer 4). In the second chromatogram, the following peaks are shown: 10.515 (ethanol adduct), 13.431 (olefinic acid related), 13.833 (olefinic acid), 14.742 (methanol adduct), 15.357 (fosfomycin), 18.297 (impurity A), 19.073 (succinic acid 1), 19.342 (succinic acid 2), 20.315 (methanol adduct+olefinic acid adduct), 21.250 (dimer 1), 21.530 (dimer 2), 22.361 (dimer 3/dimer 4), 23.262 (dimer 5+succinic acid adduct), 24.027 (dimer 6), 24.460, 26.896 (trimer 1).

Figure 8:
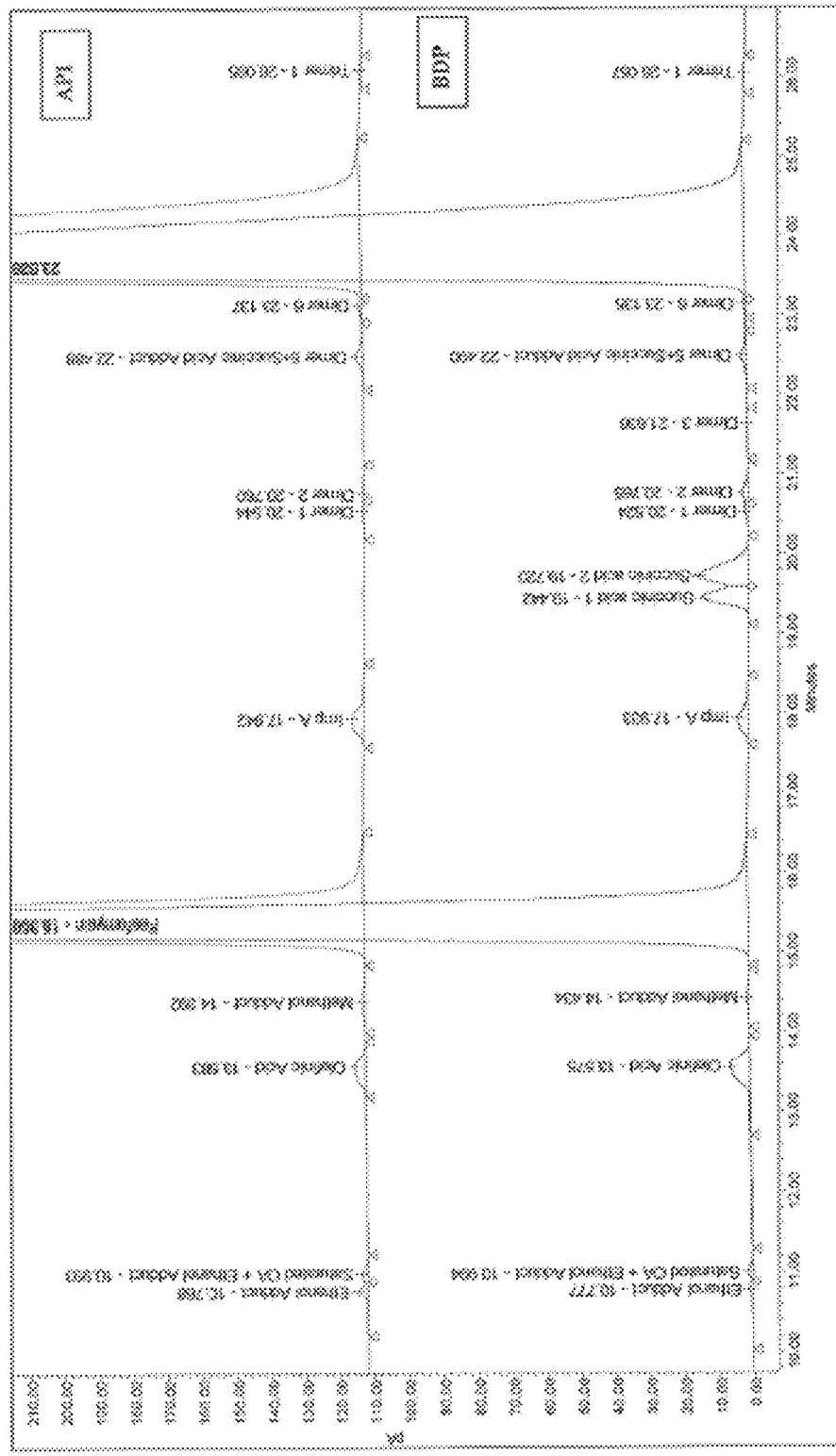
FIG. 8 shows a representative chromatogram by HILIC-HPLC-CAD of fosfomycin disodium active substance and bulk sample of fosfomycin disodium for injection drug product (admixture of fosfomycin disodium and 1.86 wt % succinic acid) (Example 2). The x-axis represents the retention time (in minutes) and the y-axis indicates the detector response (peak area).

Fosfomycin disodium API and BDP samples (FIG. 8). In the first chromatogram, the following peaks are shown: 10.768 (ethanol adduct), 10.993 (saturated olefinic acid+ethanol adduct), 13.583 (olefinic acid), 14.392 (methanol adduct), 15.368 (fosfomycin), 17.942 (impurity A), 20.544 (dimer 1), 20.760 (dimer 2), 22.488 (dimer 5+succinic acid adduct), 23.137 (dimer 6), 23.628, 26.095 (trimer 1). In the second chromatogram, the following peaks are shown: 10.777 (ethanol adduct), 10.994 (ethanol adduct), 13.575 (olefinic acid), 14.434 (methanol adduct), 15.368 (fosfomycin), 17.933 (impurity A), 19.442 (succinic acid 1), 19.720 (succinic acid 2), 20.524 (dimer 1), 20.765 (dimer 2), 21.636 (dimer 3), 22.490 (dimer 5+succinic acid adduct), 23.135 (dimer 6), 23.628, and 26.057 (trimer 1).

Example 3

HPLC-CAD-MS for Peak Identification

Peak identification of impurities was performed using HPLC coupled with charged aerosol detector (CAD) and mass spectrometry (MS).

The samples assayed were:
Fosfomycin drug product (Fosfomycin DP) following 48 months of accelerated stability at 30° C.;
Fosfomycin API aged sample (manufactured in April 2013)
These samples were expected to provide a complete profile of impurity peaks.
A Waters Q-Tof Premier Mass Spectrometer was used.
The reagents, reference standards and HPLC equipment and conditions were the same as disclosed in Example 2.
Additionally, the following mass spectrometer calibration solutions were used:
Leucine Enkephalin (1 ng/µl)
Sodium formate (10% formic acid: 0.1M NaOH: acetonitrile at 1:1:8 ratio)
A Tee-mixer was applied as a diverting valve immediately after the HPLC column. The post-column flow was then split to a ratio of 1:2 to the MS and CAD, respectively. The ratio was adjusted by using different lengths of PEEK (polyether ether ketone) tubing. A longer length resulted in a lower flow rate towards the MS, and a shorter length resulted in a higher flow rate towards the CAD. Although these different tubing lengths result in different retention times at the two detectors, the relative retention time (RRT) of each peak relative to fosfomycin was used to compare the results from the MS and the CAD.
Ionization and fragmentation conditions were developed using direct infusion of the fosfomycin drug product. Cone, capillary, and collision voltages were varied at 30 second intervals and spectra were examined at each condition. The final values for the cone and capillary voltages were chosen to yield the highest intensity without fragmenting the parent molecules. The final method parameters are detailed in Table 5 (tune page parameters) and in Table 6 (MS method parameters):

TABLE 5

| Parameter | Value |
|---|---|
| Backing Pirani | ~3.5 mbar |
| Collision Penning | ~1 × $10^{-2}$ mbar |
| TOF Penning | ≤1.2 × $10^{-6}$ mbar |
| Capillary Voltage (kV) | 2.5 |
| Sample Cone (V) | 40 |
| Source Offset (V) | 80 |
| Source Temperature (° C.) | 80 |
| Desolvation Temperature (° C.) | 100 |
| Cone Gas (L/hr) | 0 |
| Desolvation Gas (L/hr) | 1000 |
| Collision Energy (eV) | 0 |

TABLE 6

| Parameter | Value |
|---|---|
| Scan Time (sec) | 1.0 |
| Interscan Time (sec) | 0.1 |
| Start Mass | m/z 70 |
| End Mass | m/z 1000 |
| Start Time (min) | 0.0 |
| End Time (min) | 50.0 |
| Data Format | Centroid |

The mass spectrometer was calibrated in negative resolution mode for analysis of fosfomycin. Leucine enkephalin was used as standard and sodium formate was used as calibration solution.

Sample Preparations

For preparing API sample, 44±1 mg of fosfomycin API was dissolved in a 20 ml volumetric flask with 10 ml of mobile phase B, then 10 ml of mobile phase A were added, and finally q.s. of diluent was added to 20 ml.

For preparing the fosfomycin drug product (DP) sample, 22.5±0.5 mg of fosfomycin DP were dissolved in a 10 ml volumetric flask using 5 ml of diluent under sonication, and adding additional diluent to 10 ml.

Results

CAD and TIC chromatograms were performed with an aged sample of the fosfomycin drug product (DP) and a sample of fosfomycin API and were labelled on their absolute retention times. Based on the relative retention times and chromatographic profiles, the peaks observed in CAD chromatogram matched with the peaks observed in MS TIC.

Each peak identification was made based on the mass to charge ratio (m/z) data, and on the collision-induced dissociation (CID) fragments, according to known procedures in mass spectrometry.

A summary of the peaks observed and the substances identified is listed in Table 7 for Fosfomycin DP and in Table 8 for Fosfomycin API.

The first column (ID) is the substance identification, RT is the retention time (min), RRT is the relative retention time of each peak relative to fosfomycin, m/z is the mass to charge ratio, and the last column shows the structure of each identified substance. In some cases (marked with an asterisk "*" in the tables) more than one isomeric structure, having the same mass and fragments, was possible:

TABLE 7

| | CAD | | MS | | | |
|---|---|---|---|---|---|---|
| ID | RT | RRT | RT | RRT | m/z | Structure |
| *Ethanol adduct | 10.73 | 0.69 | 11.42 | 0.70 | 183.0 | (structure) |
| *Saturated olefinic acid (propylphosphonic acid) (+Ethanol adduct) | 11.97 | 0.77 | 12.26 | 0.75 | $123.0^2$ | (structure) |
| Olefinic acid related compound | 13.45 | 0.86 | 14.22 | 0.87 | 332.0 | Unknown |
| *Olefinic acid (2-propenyl phosphonic acid) | 13.90 | 0.89 | 14.60 | 0.90 | 121.0 | (structure) |
| *Methanol adduct | 14.89 | 0.96 | 15.10 | 0.93 | 169.0 | (structure) |

TABLE 7-continued

| | CAD | | MS | | | |
|---|---|---|---|---|---|---|
| ID | RT | RRT | RT | RRT | m/z | Structure |
| Fosfomycin | 15.55 | 1.00 | 16.26 | 1.00 | 137.0 | |
| Impurity A | 18.26 | 1.17 | 19.02 | 1.17 | 155.0 | |
| Succinic acid 1 | 19.45 | 1.25 | 20.15 | 1.24 | 117.0 | |
| Succinic acid 2 | 19.61 | 1.26 | 20.34 | 1.25 | | |
| *Olefinic acid adduct (rare impurity) | 20.14 | 1.30 | 20.85 | 1.28 | 259.0 | |
| *Dimer 1 | 21.16 | 1.36 | 21.88 | 1.35 | 275.0 | |
| *Dimer 2 | 21.42 | 1.38 | 22.14 | 1.36 | | |
| *Dimer 3/4 | 22.09 | 1.42 | 22.92 | 1.41 | | |
| *Dimer 5 + *Succinic acid adduct | 23.13 | 1.49 | 23.95 | 1.47 | 275.0 255.0 | |
| *Trimer | 25.28 | 1.63 | 26.41 | 1.62 | 413.0 | |

TABLE 7-continued

| | CAD | | MS | | | |
|---|---|---|---|---|---|---|
| ID | RT | RRT | RT | RRT | m/z | Structure |
| *Succinic acid bridged fosfomycin dimer | 25.71 | 1.65 | 27.45 | 1.69 | 393.0 | |

TABLE 8

| | CAD | | MS | | | |
|---|---|---|---|---|---|---|
| ID | RT | RRT | RT | RRT | m/z | Structure |
| *Ethanol adduct | 12.07 | 0.71 | 11.36 | 0.70 | 183.0 | |
| *Saturated olefinic acid (propylphosphonic acid) + Ethanol adduct | 12.81 | 0.76 | 12.21 | 0.76 | $123.0^2$ | |
| *Saturated olefinic acid (propylphosphonic acid) | 13.23 | 0.78 | 12.60 | 0.78 | | |
| Olefinic acid related compound | 13.23 | 0.78 | 12.60 | 0.78 | 332.0 | Unknown |
| *Olefinic acid (2-propenyl phosphonic acid) | 15.20 | 0.90 | 14.52 | 0.90 | 121.0 | |
| *Methanol adduct | 15.80 | 0.93 | 15.13 | 0.93 | 169.0 | |
| Fosfomycin | 16.91 | 1.00 | 16.21 | 1.00 | 137.0 | |
| Impurity A | 19.61 | 1.16 | 18.93 | 1.17 | 155.0 | |

TABLE 8-continued

| | CAD | | MS | | | |
|---|---|---|---|---|---|---|
| ID | RT | RRT | RT | RRT | m/z | Structure |
| *Olefinic acid adduct (rare impurity) | 21.39 | 1.30 | 20.79 | 1.28 | 259.0 | |
| *Methanol adduct of fosfomycin dimer (rare impurity) | 21.39 | 1.30 | 20.79 | 1.28 | 307.0 | |
| *Dimer 1 | 22.42 | 1.36 | 21.77 | 1.34 | 275.0 | |
| *Dimer 2 | 22.67 | 1.38 | 22.02 | 1.36 | | |
| *Dimer 3/4 | 23.34 | 1.42 | 22.73 | 1.40 | | |
| *Dimer 5 | 24.41 | 1.44 | 23.74 | 1.46 | | |
| *Dimer 6 | 25.20 | 1.49 | 24.39 | 1.50 | | |
| Unknown: co-elutes w/Dimer 5 (rare impurity) | 24.41 | 1.44 | 23.74 | 1.46 | 145 | Unknown |

Most of impurities were considered to be process impurities from the synthesis process.

Example 4

Stability Analysis of Fosfomycin for Injection Drug Product Using the Analytical Method of the Invention As part of a stability study of fosfomycin for injection drug product, analysis of impurities was performed according to the method of the present invention, using HILIC-HPLC method with CAD detection, as disclosed, for example, in example 2.

The sample subjected to the stability test was fosfomycin for injection drug product, namely, vials containing sterile dry powder admixture of 7.92 g of fosfomycin disodium and 150 mg of succinic acid.

The samples were kept at 25° C. and 60% RH. Analysis of impurities was performed at the following time points: 0, 1, 3, 6, 9 and 12 months. The results of the impurity analysis are shown in Table 9. Impurities are reported at weight percentage 0.05% (limit of detection of the method). "Dtd." in the table stands for "detected", meaning that the impurity is detected but is under the limit of detection (0.05 wt %). ND stands for "not detected".

TABLE 9

| | | wt % of impurities at time points (months): | | | | | |
|---|---|---|---|---|---|---|---|
| Impurities | RRT | 0 | 1 | 3 | 6 | 9 | 12 |
| Ethanol adduct | 0.67-0.70 | ND | ND | Dtd. | ND | Dtd. | Dtd. |
| Sat. O.A. + Ethanol adduct | 0.69-0.74 | ND | ND | ND | 0.07 | Dtd. | 0.05 |
| Olefinic acid related | 0.84-0.87 | Dtd. | 0.09 | Dtd. | ND | ND | ND |
| Olefinic acid | 0.88-0.90 | 0.40 | 0.46 | 0.39 | 0.42 | 0.36 | 0.40 |
| Methanol adduct | 0.93-0.97 | 0.07 | 0.18 | 0.13 | 0.35 | Dtd. | 0.12 |
| Impurity A | 1.16-1.20 | Dtd. | 0.06 | 0.07 | 0.09 | 0.11 | 0.10 |
| Dimer1 | 1.33-1.39 | 0.05 | 0.06 | 0.05 | 0.08 | 0.06 | 0.09 |
| Dimer2 | 1.35-1.41 | 0.05 | Dtd. | 0.07 | 0.10 | 0.08 | 0.11 |
| Dimer3 | 1.40-1.49 | ND | ND | ND | ND | ND | Dtd. |
| Dimer5 + Succinic ac. Adduct | 1.46-1.52 | ND | ND | 0.07 | 0.08 | ND | 0.08 |
| Trimer | 1.69-1.77 | Dtd | 0.07 | ND | Dtd. | Dtd. | Dtd. |

The invention claimed is:

1. A method for the detection and quantification of fosfomycin, impurity A, and at least one additional impurity in samples either including fosfomycin or a pharmaceutically acceptable salt thereof or including pharmaceutical compositions comprising fosfomycin or a pharmaceutically acceptable salt thereof, wherein the method comprises:
   a) subjecting the sample to hydrophilic interaction liquid chromatography (HILIC) with a gradient elution comprising as mobile phase a mixture of acetonitrile (mobile phase A) and an aqueous solution of ammonium acetate (mobile phase B) to separate the fosfomycin, impurity A, and at least one additional impurity; and
   b) detecting and quantifying the fosfomycin, impurity A, and the at least one additional impurity separated in step a) with a charged aerosol detector (CAD).

2. The method of claim 1, wherein the samples contain fosfomycin in the form of fosfomycin disodium salt.

3. The method according to claim 1, wherein a zwitterionic stationary phase is used.

4. The method according to claim 1, wherein the aqueous solution of ammonium acetate (mobile phase B) has a concentration of between 10 and 40 mM, preferably with a concentration of about 25 mM.

5. The method according to claim 1, wherein the mobile phase has an elution time of between 45 and 60 minutes, and preferably about 50 minutes.

6. The method according to claim 1, wherein the mobile phase has a flow rate of between 0.7 and 1 ml/min, and preferably about 0.8 ml/min.

7. The method according to claim 1, wherein the gradient elution changes the ratio between mobile phases A: B from about 85:15 at time 0 to about 40:60 at about time 35 min, and changes back to about 85:15 at the end of the elution time, and wherein the elution time is between 45 and 60 minutes, and preferably about 50 minutes.

8. The method according to claim 7, wherein the 85:15 ratio between mobile phases A: B is maintained constant for about 3 to 8 minutes at the beginning of the elution time and/or for about the last 8 to 15 minutes at the end of elution time.

9. The method according to claim 7, wherein the 40:60 ratio between mobile phases A: B is maintained constant for about 3 minutes approximately from time point 35 minutes to time point 38 minutes.

10. The method according to claim 7, wherein the gradient elution, expressed as the ratio of mobile phases A: B, is performed as follows: 85:15 (0 min), 85:15 (5.0 min), 40:60 (35.0 min), 40:60 (38.0 min), 85:15 (38.1 min) and 85:15 (50.0 min).

11. The method according to claim 1, wherein the identification of the at least one additional impurity is carried out by mass spectrometry (MS).

12. A process for validating the quality of fosfomycin or a pharmaceutically acceptable salt thereof having a specified value of purity degree, wherein the process comprises the following steps:
(i) providing a batch of either fosfomycin or a pharmaceutically acceptable salt thereof, or a pharmaceutical composition comprising fosfomycin or a pharmaceutically acceptable salt thereof and at least one pharmaceutically acceptable excipient;
(ii) quantifying impurity A and at least one additional impurity in a sample taken from the batch of step (i) with the method of claim 1; and
(iii) validating the batch only if the percentage of impurity A and the at least one additional impurity in the sample fulfills the specified value of purity degree.

13. The method according to claim 1, wherein the sample includes fosfomycin disodium as an active ingredient.

14. The method according to claim 1, wherein the sample includes fosfomycin disodium as an active ingredient and at least one pharmaceutically acceptable excipient.

15. The method according to claim 14, wherein the pharmaceutically acceptable excipient is succinic acid.

16. Fosfomycin or a pharmaceutically acceptable salt thereof having a specified value of purity degree obtainable by the process of claim 12.

17. A pharmaceutical composition comprising fosfomycin or a pharmaceutically acceptable salt thereof and at least one pharmaceutically acceptable excipient having a specified value of purity degree obtainable by the process of claim 12.

18. The method of claim 1, wherein the at least one impurity comprises at least one degradation product of fosfomycin.

19. The method of claim 12, wherein the at least one impurity comprises at least one degradation product of fosfomycin.

* * * * *